United States Patent [19]
Sawano et al.

[11] Patent Number: 4,812,014
[45] Date of Patent: Mar. 14, 1989

[54] WATER PENETRATION-DETECTING APPARATUS AND OPTICAL FIBER CABLE USING SAME

[75] Inventors: Hiroyuki Sawano, Sakura; Hideo Suzuki, Funabashi; Yasuyuki Sugawara, Chiba; Kazunaga Kobayashi, Sakura; Nobuyasu Sato, Funabashi, all of Japan

[73] Assignee: Fujikura Ltd., Tokyo, Japan

[21] Appl. No.: 47,357

[22] Filed: May 6, 1987

[30] Foreign Application Priority Data

| May 9, 1986 | [JP] | Japan | 61-106290 |
| May 9, 1986 | [JP] | Japan | 61-106291 |
| May 9, 1986 | [JP] | Japan | 61-106292 |
| Mar. 20, 1987 | [JP] | Japan | 62-67108 |
| Mar. 20, 1987 | [JP] | Japan | 62-67109 |

[51] Int. Cl.⁴ ............... G01N 21/88; G02B 6/44
[52] U.S. Cl. ................... 350/96.29; 350/96.23; 250/227
[58] Field of Search .......... 350/96.29, 96.23; 250/227

[56] References Cited

U.S. PATENT DOCUMENTS

| 4,159,420 | 6/1979 | Tsunoda | 250/227 |
| 4,221,962 | 9/1980 | Black et al. | 250/227 |
| 4,270,049 | 5/1981 | Tanaka et al. | 350/96.15 X |
| 4,456,331 | 6/1984 | Whitehead et al. | 350/96.23 |
| 4,654,520 | 3/1987 | Griffiths | 350/96.29 X |

FOREIGN PATENT DOCUMENTS 0174424  3/1986  European Pat. Off. ......... 350/96.23

Primary Examiner—John D. Lee
Attorney, Agent, or Firm—Sprung Horn Kramer & Woods

[57] ABSTRACT

A water penetration-detecting apparatus includes an optical fiber sensor having an optical fiber, and a water-absorbent material disposed along the optical fiber in contiguous relation to the fiber. The water-absorbent material, when absorbing water, expands volumetrically so as to apply a pressure to an outer peripheral surface of the optical fiber to bend the fiber. A detecting means is connected to the optical fiber sensor for detecting a bending of the optical fiber.

15 Claims, 5 Drawing Sheets

WATER PENETRATION-DETECTING APPARATUS AND OPTICAL FIBER CABLE USING SAME

BACKGROUND OF THE INVENTION

1. Field of the Invention

This invention relates to apparatus for detecting water penetration, for example, into a power cable and a communication cable.

2. Prior Art

Generally, a power cable and a communication cable are installed in transmission line passages inside and outside the city and aee also installed in the bottom of the sea.

Heretofore, alarm wires (i.e., sensor) in hhe form of a bare wire, a paper-insulated wire or a plastics-insulated wire is mounted within the calle so as to extend therealong, and when water penetrates into the cable at a location, the alarm wires are short-circuited at that location for the purpose of detecting the water penetration. However, with such alarm wires, the location of the cable at which the water penetration has occureed can not be detected accurately and rapidly. In addition, such alarm wires have a relatively low sensitivity to the water penetration, and therefore it is necessary to increase the number of the cables joints in order to enhance the sensitivity. Further, the alarm wires which comprises a conductor of metal can not be used in those regions where electromagnetic induction is encountered.

In recent years, very long optical fiber cables are jointed together at their ends to provide a communication line, in which case the alarm wires are too short to be mounted within such an optical fiber cable over the entire length of the cable. Also, in the conventional communication cable and the optical cable, there is a risk that water tends to penetrate or intrude into the transmission line though the cable joint. Therefore, it has long been desired to provide a water penetration-detecting apparatus which is free from the above problems.

SUMMARY OF THE INVENTION

It is therefore an object of this invention to provide a water penetration-detecting apparatus which can accurately and rapidly detect water penetration with a high sensitivity, and is not affected by electromagnetic induction, and can be used in a transmission line composed of long cables joined together.

According to the present invention, there is provided a water penetration-detecting apparatus comprising: (a) an optical fiber sensor comprising (i) an optical fiber, and (ii) a water-absorbent material disposed along the optical fiber in contiguous relation to the fiber, the water-absorbent material, when absorbing water, expanding volumetrically so as to apply a pressure to an outer peripheral surface of the optical fiber to bend the fiber; and (b) a detecting means for detecting a bending of the optical fiber.

DESCRIPTION OF THE PREFERRED EMBODIMENTS OF THE INVENTION

Figure 1:
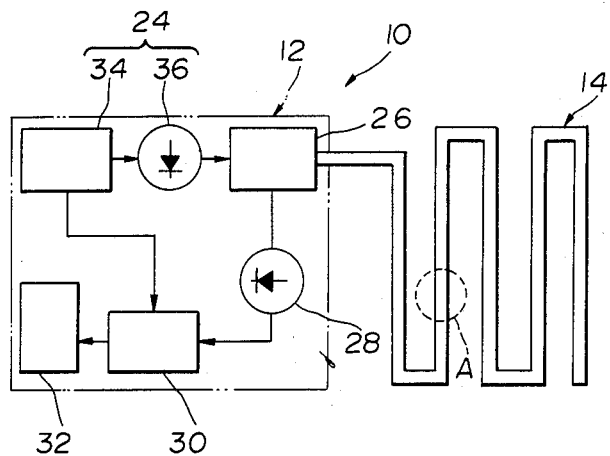
FIG. 1 is a schematic view of the water penetration-detecting apparatus provided in accordance with the present invention.

The invention will now be described with reference to the drawings in which like or the same reference numerals denotes corresponding parts in several viwws.

Figure 2:
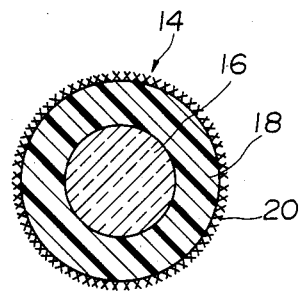
FIG. 2 is a cross-sectional view of an optical fiber sensor of the water penetration-detectigg apparatus.

FIG. 1 shows a water penetration-detecting apparatus 10 which comprises a detecting device 12 and an optical fiber sensor 14. As best shown in FIG. 2, the optical fiber sensor 14 comprises an optical fiber 16, a water-absorbent member or coating 18 mounted around the entire circumference of the optical fiber 16 and extending therealong, and a cover member 20 of a net structure wound around the water-absorbent member 18 and extending therealong. The optical fiber 16 and the water-absorbent member 18 are disposed coaxially with each other. The optical fiber 16 is of the ordinary type such as silica glass fiber. The water-absorbent member 18 absorbs water efficiently, and this water-absorbent member radially expands or bulges when it absorbs water, so that the expanded portion of the water-absorbent member 18 imparts a lateral pressure to an outer peripheral surfface of the optical fiber 16, thereby bending the optical fiber 16. The amount of transmission loss of light of the optical fiber 16 due to the bending thereof is detected through the detecting device 12 so as to locate the bent portion of the optical fiber 16. Thus, the portion of the optical fiber sensor 14 to which water is applied is located.

The water-absorbent member 18 has a water absorption of not less than 10 Wt. %, and is made of ultraviolet-curing resin, modified polyamide resin having a solubility with water and alcohol, or a resin mixture having water-absorbent powder dispersed therein. The ultraviolet-curing resin is, for example, epoxy acrylate resin, urethane acrylate resin or silicone acrylate resin. The above resin mixture comprises, for example, a major proportion of one of the above-mentioned resins and other thermoplastic polymer, and the water absorbent powder selected from the group consisting of powdered graft polymer of starch and acrylic acid (or acrylate), powdered resin composed of either polyacrylic acid or polyacrylate crosslinked by a crosslinking agent, powdered copolymer of polyvinyl alcohol and maleic anhydride, and carboxymethylcellulose (CMC).

The thickness of the water-absorbent member or film 18 is determined depending on its water-absorbing ability and its coefficient of volumetric expansion. Preferably, this thickness is in the range of between 200 to 900 $\mu$m. If this thickness is less than 200 $\mu$m, the water-absorbent member 18 has an insufficient water-absorbing ability and a lower coefficient of volumetric expansion. As a result, the expanded water-absorbent member 18 does not impart a sufficient lateral pressure to the optical fiber 16, so that the optical fiber 16 is not compressed sufficiently and therefore is not bent to such an extent that the bent portion can be detected. On the other hand, if the thickness of the water-absorbent member 18 exceeds 900 μm, the portion of the water-absorbent member 18 which is radially expanded upon absorption of water is relatively large. As a result, the bending of the optical fiber 16 is correspondingly extensive, so that the position of the water penetration can not accurately located rapidly.

When the optical fiber senso 14 is subjected to water at a portion thereof, the cover member of a net structure 20 allows the water to pass therethrough to the water-absorbent member 18 and also limits the radial expansion of the member 18 so as to amplify the bending of the optical fiber 16. Thus, the cover member serves as an expansion-restraint member. Preferably, the cover member 20 is made of metal or a synthetic resin, and it is preferred that the mesh of the cover member 20 is fine.

A method of producing the optical fiber sensor 14 will now be described. First, a long optical fiber 16 having a predetermined diameter and a predetermined mode is produced from a optical fiber rreform of silica or the like, using a well known method such as VAD method. Then, a water-absorbent material is coated on the optical fiber 16, and the coated material serves as the water-absorbent member 18. In the case where the water-absorbent member 18 is made of a thermoplastic resin, it is coated on the optical fiber 16 by means of melt extrusion. In the case where the water-absorbent member 18 is made of either a thermosetting resin or a ultraviolet-curing resin, it is coated on the optical fiber by means of an ordinary coater. Then, the cover member 20 of a net structure is wound around the water-absorbent member 18 to provide the optical fiber sensor 14.

The optical fiber sensor 14 thus obtained is installed, for example, in an optical fiber cable, in which case when water intrudes into the optical fiber cable, the water-absorbent member 18 is volumetrically expanded radially or bulged to apply a pressure to the optical fiber 16 so as to bend the optical fiber 16 at a location where the water has intruded into the optical fiber cable. Thus, the location of the water intrusion is positively detected through the detecting device 12.

The detecting device 12 will now be described with reference to FIG. 1. The detecting device 12 is connected to one end of the optical fiber sensor 14. The detecting device 12 measures a time delay of reflection of light pulses fed into the optical fiber 16, and also measures a level of the received light, thereby detecting that portion of the optical fiber 16 where a bending develops. The detecting device 12 comprises a light-emitting portion 24, a light-detecting portion 28, a light direction coupler 26, a calculating portion 30 and a display portion 32. The light-emitting portion 24 comprises a pulse generator 34 for supplying light pulses into the optical fiber 16 through one end thereof, and a light-emitting element 36 such as a laser diode (LD) and a light-emitting diode (LED). The light-detecting portion 26 comprises a light-receiving element such as an avalanche photodiode (APD) which receives from the optical fiber 16 reflected light pulses such as back-scattered light. The light direction coupler 28 controls the flow of the light pulses from the light-emitting portion 24 and the flow of the reflected light pulses from the optical fiber 16. The calculating portion 30 calculates a time delay in the delivery of the reflected light pulses. The display portion 32 displays the calculation results obtained from the calculating portion 30.

The operation of the water penetration-detecting apparatus 10 will now be described. First, the detecting device is connected to one end (input end) of the optical fiber sensor 14, and then the optical fiber sensor 14 is installed, for example, all over each floor of a building accommodating communication equipment. Thus, the installation of the water penetration-detecting apparatus 10 is completed. In FIG. 1, if a water penetration accident occurs at an area A, the optical fiber sensor 14 located at the area A is immersed in water. Therefore, the waer intrudes into the water-absorbent member 18 through the net cover 20 at the area A, so that the water-absorbent member 18 absorbs the water and expands volumetrically. Since the net cover 20 suitably limits the radial expansion of the water-absorbent member 18, a lateral pressure is applied to the optical fiber at the area A, so that the portion of the optical fiber 16 subjected to this lateral pressure is bent either relatively positively or slightly. The amount of increase of light transmission loss of the optical fiber due to the bending of the optical fiber 16 is detected by the detecting device 12 based on the time delay of the reflected light pulses ( such as back-scattered light) returned to the input end of the optical fiber 16 and a change in the level of the received light. The calculating portion 30 analyzes the measured data of the reflected light pulses so as to determine the distance between the input end of the optical fiber 16 and the bent portion of the fiber 16. This results are displayed on the display portion 32, so that the water penetration accident at the area A can be noticed easily and rapidly. An emergency measure for the water penetration accident may be taken immediately.

The water penetration-detecting apparatus 10 can be installed in any other installation. For example, the optical fiber sensor 14 can be installed within a communication cable together with electric communication wires and communication optical fibers. Also, the water penetration-detecting apparatus 10 can be installed in a warehouse in which moisture-absorbent material or the like is stored.

Figure 3:
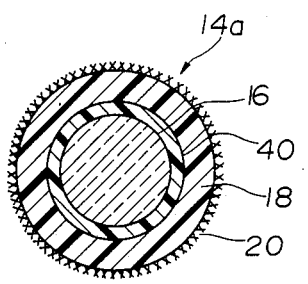
FIG. 3 is a view similar to FIG. 2 but showing a modified optical fiber sensor.

FIG. 3 shows a modified optical fiber sensor 14a which differs from the optical fiber 14 of FIG. 2 in that a protective layer 40 is coated around the optical fiber. The protective layer 40 protects the optical fiber 16 and positively transmits the volumetric expansion of the water-absorbent member 18 in cooperation with the net cover 20 which prevents the radial outward expansion of the water-absorbent member 18. The protective layer 40 is made of a material which is capable of applying a lateral pressure to the optical fiber 16 without delay when the water-absorbent member 18 absorbs water and expanded volumetrically. More specifically, the protective layer 40 is made of a thermoplastic resin, a thermosetting resin, a ultraviolet-curing resin or styrenisoprene-styren copolymer elastomer. For example, the thermoplastic resin is low-density polyethylene (LDPE), high-density polyethylene (HDPE), polypropylene (PP), ethylene-vinyl acetate copolymer (EVA), ethylene ethyl acrylate (EEA), polyurethane resin, polyester resin, or nylon. The thermosetting resin is, for example, silicone resin or urethane resin. The ultraviolet-curing resin is, for example, epoxy acrylate resin, urethane acrylate resin or silicone acrylate resin. The protective layer 40 is of such a thickness that an external force is prevented by the protective layer 40 from affecting the optical fiber 16 and that the protective layer 40 positively transmits the volumetric expansion of the water-absorbent member 18 to the optical fiber 16. Preferably, the thickness of the protective layer 40 is 30 to 100 μm. If this thickness is less than 30 μm, the protective layer 40 can not prevent an external force from affecting the optical fiber 16. In this case, if a bending develops on the optical fiber 16, it can not be determined whether this bending is due to such external force or the expansion of the water-absorbent member 18. On the other hand, if the thickness of the protective layer 40 exceeds 100 μm, the layer 40 fails to positively transmit the volumetric expansion of the water-absorbent member 18, so that any bending develops on the optical fiber even if water penetration occurs.

A method of producing the optical fibrr sensor 14a will now be described. First, a long optical fiber 16 is produced from a optical fiber preform, as described above for the optical fiber sensor 14. Then, the protective layer 40 is coated on the optical fiber 16. In the case where the protective layer 40 is made of a thermoplastic resin, it is coated on the optical fiber 16 by means of melt extrusion. In the case where the protective layer 40 is made of either a thermosetting resin or a ultraviolet-curing resin, it is coated on the optical fiber 16 by means of an ordinary coater. Then, the water-absorbent member 18 is coated on the protective layer 40 according to the same procedure as described above for the optical fiber sensor 14 except that the water-absorbent member 18 is coated on the protective layer. In this manner, the optical fiber sensor 14a is produced.

The invention will now be illustrated by way of the following Examples.

EXAMPLE 1

An optical fiber was produced from an optical fiber preform of silica glass. The optical fiber thus obtained was of the graded index type having a core inner diameter of 50 μm and a clad outer diameter of 125 μm. The optical fiber had a refractive index difference of 1%. Then, a protective layer of urethane acrylate of the ultraviolet-curing type was coated on the optical fiber, the protective layer having a thickness of about 80 μm. Then, a water-absorbent layer or member was coated on the protective layer to produce an optical fiber sensor similar to the optical fiber sensor 14a of FIG. 3. The water-absorbent member was made of water-absorbent nylon (AQ-Nylon A-90) manufactured by Toray Company (Japan). A plurality of the optical fiber sensors thus obtained were fusingly bonded end-to-end to provide a long, continuous optical fiber sensor of 30 km. One end of this long optical fiber sensor was connected to the detecting device 12 (FIG. 1) to provide a water-penetration detecting apparatus. The detecting device 12 in this Example used LD as the light-emitting portion and used Ge-APD as the light-detecting portion. A loss-measuring precision of this detectigg device 12 was ±0.06 dB. The optical fiber sensor was immersed in water at two points spaced 10 km and 20 km, respectively, from the input end of the optical fiber sensor. The transmission loss increase of the optical fiber of the optical fiber sensor was 0.3 dB at the point of 10 km and 0.2 dB at the point of 20 km. Thus, it was detected that the transmission loss was increased in accordance with the point of the water penetration.

EXAMPLE 2

An optical fiber was prepared according to the same procedure in Example 1 except that the water-absorbent member was composed of vinyl acetate copolymer (which had a melt index of 3.0 and contained 20% of vinyl acetate) and 100 phr of water absorbent powder (sold by Sumitomo Chemical Company under the tradename "Sumica-gel") dispersed therein. The thickness of the water-absorbent member was about 300 μm.

According to the same procedure in Example 1, the transmission loss was measured. The transmission loss increase was 1.1 dB at a point of 10 km an 1.2 dB at a point of 20 km.

EXAMPLE 3

An optical fiber was produced from an optical fiber preform of silica glass. The optical fiber thus obtained was of the step index type having a core inner diameter of 50 μm and a clad outer diameter of 125 μm. The optical fiber had a refractive index difference of 0.7%. Then, a protective layer of silicone resin of the ultraviolet-curing type was coated on the optical fiber, the protective layer having a thickness of about 80 μm. Then, a water-absorbent layer or member was coated on the protective layer to produce an optical fiber sensor. The water-absorbent member was composed of a thermosetting-type silicone resin and 100 phr of water absorbent powder (sold by KAO; poise: SA-10) dispersed therein. The thickness of the water-absorbent member was about 300 μm. According to the same procedure in Example 1, the transmission loss was measured. The transmission loss increase was 2.1 dB at a point of 10 km and 2.3 dB at a point of 20 km.

EXAMPLE 4

An optical fiber was produced from an optical fiber preform of silica glass. The optical fiber thus obtained was of the single mode type having a core inner diameter of 10 μm and a clad outer diameter of 125 μm. The optical fiber had a refractive index difference of 0.3%. The, a protective layer of epoxy acrylate resin of the ultraviolet type was coated on the opticll fiber, the protective layer having a thickness of 80 μm. Then, a water-absorbent member was coated on the protective layer to produce an optical fiber. The water-absorbent member was composed of styrene-isoprene-styrene copolymer elastomer and 100 phr of water-absorbent powder (sold by Kurare Isopren Chemical Company under the tradename "K1 Gel") dispersed therein. The thickness of the water-absorbent member was about 300 μm. A plurality of the optical fiber sensors thus obtained were fusingly bonded end-to-end to provide a long, continuous optical fiber sensor of 50 km. According to the same procedure in Example 1, the transmission loss was measured except that the long optical fiber was immersed in water at two points spaced from 30 km and 40 km, respectively, from the input end of the optical fiber. The detecting device 12 used YAG laser as the light-emitting portion and Ge-APD as the light-detecting portion. The transmission loss increase was 0.2 dB at the point of 30 km and 0.3 dB at the point of 40 Km.

Figure 4:
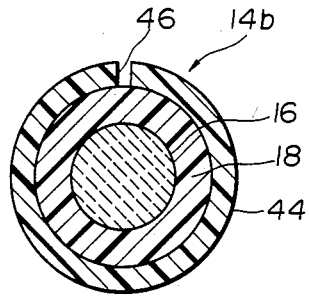
FIGS. 4 to 7 are views similar to FIG. 2 but showing further modified optical fiber sensors, respectively.

FIG. 4 shows another modified optical fiber sensor 14b which differs from the optical fiber sensor 14 of FIG. 2 in that an expansion-restraint outer layer 44 coated on the water-absorbent member or layer 18 along the entire length thereof. The expansion-restraint layer 44 liiits the radial expansion of the water-absorbent member 18 so as to amplify the bending of the optical fiber 16 at the time when the optical fiber sensor 14b is subjected to water. Thus, the expansion-restraint layer 44 serves as an expansion-restraint member. A plurality of water-introducing apertures or notche 46 are formed radially through the expansion-restraint layer 44 and extend between the inner and outer surface of the expansion-restraint layer 44, the apertures 46 being spaced at an equal interval along the length of the expansion-restraint layer. When the optical fiber sensor 14b is immersed in water, the aperture 46 exposed to the water allows the water to pass therethrough to the water-absorbent member 18, so that the water-absorbent member 18 absorbs the water and expands radially. The water-introducing apertures 46 are of such a size as to enable the passage of the water therethrough and to efficiently limit the radial expansion of the water-absorbent member 18. The number of the water-introducing apertures 46 is determined in accordance with the sensitivity of the optical fiber sensor and usually 100 to 1000 per 1 km.

The expansion-restraint layer 44 is made of a material having a sufficient mechanical strength to limit the radial outward expansion of the water-absorbent member 18. The expansion-restraint layer 44 is made of a thermoplastic resin, a thermosetting resin, a ultraviolet-curing resin, a foamed resin, metal such as lead and aluminum, or polyester elastomer. The thermoplastic resin is, for example, soft polyvinyl chloride (PCV), low-density polyethylene (LDPE), high-density polyethylene (HDPE), polypropylene (PP), ethylene-vinyl acetate copolymer (EVA), ethylene ethyl acrylate copolymer (EEA), polyurethane resin, polyester resin, or nylon. The thermosetting resin is, for example, silicone resin or urethane resin. The ultraviolet-curing resin is, for example, epoxy acrylate resin, urethane arrylate resin, or silicone acrylate resin. The foamed resin is, for example, foamed polyethylene. A laminated sheath using metal such as aluminum can also be used as the expansion-restraint layer 44. Particularly where the expansion-restraint layer 44 is made of the above ultraviolet-curing resin, it is preferred that its Young's modulus should be relatively high and that its tensile strength should be not less than 2.0 kg/mm$^2$.

The thickness of the expansion-restraint layer 44 is usually 300 to 1,000 μm. If this thickness is less than 300 μm. the layer is too thin to achieve the above-mentioned effects. On the other hand, even if the thickness exceeds 1,000 μm, the effects obtained will not be changed appreciably, and this is uneconomical because of the increased amount of the material.

For producing the optical fiber sensor 14b of FIG. 4, the water-absorbent member or layer 18 is coated on the optical fiber 16 as described above for the optical fiber sensor 14 of FIG. 2. Then, the expansion-restraint layer 44 is coated on the water-absorbent member 18. In the case where the expansion-restraint layer 44 is made of a thermoplastic resin, it is coated on the water-absorbent member 18 by means of melt extrusion. In the case where the expansion-restraint layer 44 is of either a thermosetting resin or a ultraviolet-curing resin, it is coated on the water-absorbent member 18 by an ordinary coater. Then, the expansion-restraint layer 44 is cut to provide the water-introducing apertures 46 to provide the optical fiber sensor 14b. Alternatively, as the water-absorbent material, water-absorbent yarns containing modified polyacrylonitrile resin or yarns made of carboxymethylated viscose rayon are interposed between the optical fiber 16 and the expansion-restraint layer 44 and extend along the length thereof. Another alternative is to use the water-absorbent powder of the type described above for the optical fiber sensor 14 of FIG. 2 so as to provide the water-absorbent material between the optical fiber 16 and the expansion-restraint layer 44. Also, fibers or filaments made of material having a high tensile strength such as KEVLAR fiber (aramide fiber) may be interposed between the optical fiber and the expansion-restraint layer 44 and extend therealong in order to increase a tensile strength of the optical fiber sensor 14b. Further, one or more protective layers may be interposed between the optical fiber 16 and the water-absorbent member 18 for the same reasons mentioned above for the protective layer 14 of the optical fiber sensor 14a of FIG. 3.

Figure 5:
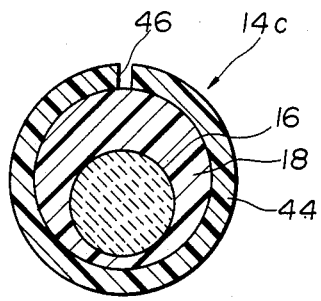

FIG. 5 shows a further modified optical fiber sensor 14c which differs from the optical fiber sensor 14b of FIG. 4 in that the optical fiber 16 is eccentric with respect to the water-absorbent member 18 in a direction away from the apertures 46. With this arrangement, the apertures 46 open to the thickened portion of the water-absorbent member 18.

With respect to the optical fiber sensors 14b and 14c of FIGS. 4 and 5, the apertures 46 spaced along the length of the expansion-restraint layer 44 may be replaced by a continuous slot extending along the length of the expansion-restraint layer. Also, the apertures 46 may not be provided at an equal distance and may be provided intensively at those portions which are positioned at those locations where a water penetration accident is well expected. Further, although the cross-section of the aperture 46 is rectangular, it may be of any cross-sectional shape.

EXAMPLE 5

An optical fiber was produced from an optical fiber preform of silica glas.. The optical fiber thus obtained was of the graded index type having a core inner diameter of 50 μm and a clad outer diameter of 125 μm. The optical fiber had a refractive index difference of 1%. Then, a protective layer of urethane acrylate of the ultraviolet-curing type was coated on the optical fiber, the protective layer having a thickness of about 80 μm. Then, water-absorbent yarns of acrylonitrile-based material were disposed circumferentially around the protective layer and were extended therealong. Then, an expansion-restraint layer of soft polyvinyl chloride resin was coated, the expansion-restraint layer having a thickness of about 600 μm. Then, water-introducing apertures were cut through the expansion-restraint layer at an interval of 1 m, each aperture having a width of 2 mm and a length of 2 cm, thereby providing an optical fiber sensor. A plurality of optical fiber sensors thus obtained were fusingly joined end-to-end to provide a long, continuous optical fiber sensor of 30 km. According to the same procedure in Example 1, the transmission loss was measured. The transmission loss increase was 0.5 dB at a point of 10 km and was 0.6 dB at a point of 20 km. Based on the transmission loss thus measured, the two points of water penetration were detected with an error of ±20 m.

EXAMPLE 6

An optical fiber was produced from an optical fiber preform of silica glass. The optical fiber thus obtained was of the step index type having a core inner diameter of 50 μm and a clad outer diameter of 125 μm. The optical fiber had a refractive index difference of 0.7%. Then, a first protective layer of silicone resin of the ultraviolet-curing type was coated on the optical fiber, and then a second protective layer of nylon was coated on the first protective layer. The first and second protective layers were 140 μm and 125 82 m thick, respectively. Then, water-absorbent yarns of acrylonitrile-based material were disposed circumferentially around the second protective layer and were extended therealong. Four KEVLAR fibers (1140 denier) were also extended along the second rrotective layer. Then, an expansion-restraint layer of polyester elastomer (tradename: Hi-torel) was coated on the water absorbent yarns and the KEVLAR fibers. The expansion-restraint layer had a thickness of about 300 μm. Then, water-introducing apertures were cut through the expansion-restraint layer at an interval of 1 m, each aperture having a width of 2 mm and a length of 2 cm, thereby providing an optical fiber sensor. According to the same procedure in Example 1, the transmission loss was measured. The transmission loss increase was 2.5 dB at a point of 10 km and was 2.6 dB at a point of 20 km. Based on the transmission loss thus measured, the point of 10 km was detected as 10.02 km, and the point of 20 was detected as 20.01 km. The optical fiber sensor was subjected to a tensile test, and it withstood not less than 14 kg with 0.2% elongation.

EXAMPLE 7

An optical fiber was prepared according to the same procedure in Example 4. Then, a protective layer of epoxy acrylate resin of the ultraviolet-curing type was coated on the optical fiber, the protective layer having a thickness of about 80 μm. Then, a water-absorbent member was coated on the protective layer. The water-absorbent member was composed of vinyl acetate copolymer (which had a melt index of 3.0 and contained 20% of vinyl acetate) and 100 phr of water-absorbent powder (Sumica-Gel) dispersed therein. The thickness of the water-absorbent member was about 300 μm. Then, an expansion-restraint layer of foamed polyurethane of the open cell type having a foaming extent of 60% was coated on the water-absorbent member to form an optical fiber sensor. The thickness of the expansion-restraint layer was about 550 μm.

Then, a plurality of optical fiber sensors thus obtained were fusingly bonded end-to-end to provide a long, continuous optical fiber sensor. Then, the transmission loss was measured, using the detecting device used in Example 4. The transmission loss increase was 0.4 dB at a point of 30 km and was 0.6 dB at a point of 40 km. Based on the transmission loss thus measured, the point of 30 km was detected as 30.01 km, and the point of 40 km was detected as 39.98 km.

EXAMPLE 8

An optical fiber with a protective layer and water-absorbent yarns was prepared according to the same procedure in Example 5 except that the expansion-restraint layer was omitted. Then, the optical fiber with the protective layer was inserted into a pipe of nylon together with the water-absorbent yarns, thereby forming an optical fiber sensor. The nylon pipe had an inner diameter of 2.0 mm and an outer diameter of 3.0 mm and had slot extending therealong. According to the same procedure in Example 1, the transmission loss was measured. The transmission loss increase was 0.4 dB at a point of 10 km and was 0.6 dB at a point of 20 km. Based on the transmission loss thus measured, the point of 10 km was detected as 9.99 km, and the point of 20 km was detected as 20.01 km.

EXAMPLE 9

An optical fiber with first and second protective layers was prepared according to the same procedure to Example 6. Then, the optical fiber with the first and second protective layers was inserted into a pipe of nylon having an inner diameter of 2.0 mm and an outer diameter of 3.0 Mm and having a slit extending therealong. Then, water-absorbent powder (sold by KAO; poise:SA-10) was filled in a spaced formed between the outer surface of the second protective layer and the inner surface of the pipe, thereby forming an optical fiber sensor. According to the same procedure in Example 1, the transmission loss was measured. The transmission loss increase was 2.1 dB at a point of 10 km and was 2.3 dB at a point of 20 km. Based on the transmission loss thus measured, the point of 10 km was detected as 9.99 km, and the point of 20 km was detected as 19.99 km.

EXAMPLE 10

An optical fiber with a protective layer was prepared according to the same procedure in Example 7. Then, the optical fiber with the protective layer was inserted into a pipe of polyethylene having an innrr diameter of 2.0 mm and an outer diameter of 3.0 mm and having a slit extending therealong. Then, water-absorbent powder (K1 Gel) was filled in a space formed between the outer surface of the protective layer and the inner surface of the pipe, thereby providing an optical fiber sensor. A plurality of optical fiber sensors thus obtained were fusingly bonded end-to-end to form a long, continuous optical fiber sensor of 50 km. Then, the transmission loss was measured, using the detecting device used in Example 4. The transmission loss increase was 0.3 dB at a point of 30 km and was 0.4 dB at a point of 40 km. Based on the transmission loss thus measured, the point of 30 km was detected as 30.01 km, and the point of 40 km was detected as 40.01 km.

Figure 6:
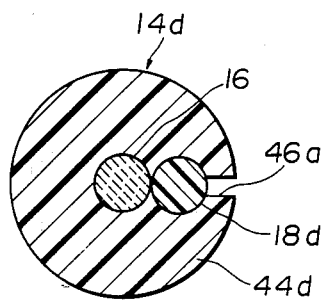

FIG. 6 shows a further modified optical fiber sensor 14d which differs from the optical fiber sensor 14b of FIG. 4 mainly in that a water-absorbent member 18d is in the form of a rod. More specifically, the optical fiber sensor 14d comprises an optical fiber 16, the water-absorbent member 18d disposed in contiguous relation to the optical fiber 16 and extends therealong, and an expansion-restraint layer 44d coated on the optical fiber 16 and water-absorbent member 18d so as to cover them. The water-absorbent member 18d is made of the same material as described above for the opticll fiber sensor 14b of FIG. 4. The diameter of the rod-like water absorbent member 18d is 100 to 400 μm. The water-absorbent member 18d is of a circular cross-section, but it may be of any other cross-section. Water-introducing apertures 46a are formed in the expansion-restraint layer 44d and extends from the outer surface of the expansion-restraint layer 44d to the outer surface of the water-absorbent member 18d, the apertures 46a being spaced along the length of the expansion-restraint layer as described above for the optical fiber sensor 14b of FIG. 4. The expansion-restraint layer 44d is made of the same material as described above for the expansion-restraint layer 44 of FIG. 4. The apertures 44a may be replaced by a slot extending along the exaansionrestraint layer as described above for the expansion-restraint layer of FIG. 4.

The optical fiber sensor 14d of FIG. 6 operates in a manner similar to the optical fiber sensor 14b of FIG. 4. More specifically, when water passes through the apertures 46a to the water-absorbent member 18d, the water-absorbent member 18d absorbs the water and expands volumetrically, so that the expanded water-absorbent member 18d imparts a lateral pressure to the optical fiber 16, thereby bending the optical fiber locally or partially. As described above in the preceding embodiments, the expansion-restraint layer 44d limits the radial outward expansion of the water-absorbent member 18d.

Figure 7:
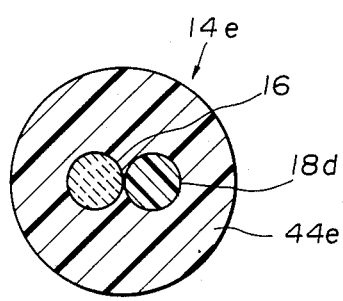

FIG. 7 shows a further modified optical fiber sensor 14e which differs from the optical fiber sensor 14d of FIG. 6 in that an expansion-restraint layer 44e is made of a water-permeable material such as a foamed urethane resin of the open cell type and in that the apertures 46 are omitted. The water-permeable expansion-restraint layer 44e is made, for example, of a thermoplastic foam such as foamed polyvinyl chloride, foamed polystyrene resin, foamed ABS resin, or a thermosetting foam such as soft foamed polyurethane resin, foamed phenol resin and foamed urea resin. The foamed degree of such foamed material is 10 to 80%. If the foamed degree is less than 10%, the foamed material does not allow water to pass therethrough sufficiently. On the other hand, if the foamed degree exceeds 80%, the porosity of the foamed material is excessive, s that it can not efficiently limit the radial expansion of the water-absorbent member 18d. As a result, a required lateral pressure can not be applied to the optical fiber 16.

As described above for the optical fibers 14b and 14c of FIGS. 4 and 5, KEVLAR fibers may be provided in the expansion-restraint layer 44d 444e) so as to extend along the optical fiber 16 and the rod-like water-absorbent member 18d. Also, one or more protective layers may be formed on the optical fiber 16.

EXAMPLE 11

According to the same procedure in Example 4, an optical fiber with a protective layer was prepared. Then, a rod-like water-absorbent member made of water-absorbent nylon was prepared, the water-absorbent member having a diameter of 300 μm. Th optical fiber and the water-absorbent member were arranged in parallel contiguous relation to each other. Then, an expansion-restraint layer of urethane acrylate of the ultraviolet-curing type was coated on the optical fiber and water-absorbent member so as to cover it, the expansion-restraint layer having a thickness of 300 to 400 μm. Then, water-introducing apertures were cut through a peripheral wall of the expansion-restraint layer at an interval of 1 m along the length thereof, thereby providing an optical fiber sensor. Each aperture hadaa width of 2 mm and a length of 2 cm.

A plurality of the optical fiber sensors thus obtained were fusingly bonded end-to-end to provide a long, continuous optical fiber sensor of 50 km. The transmission loss was measured, using the detecting device used in Example 4. The transmission loss increase was 0.4 dB at a point of 30 km and was 0.6 dB at a point of 40 km. Based on the transmission loss thus measured, the point of 30 km was detected as 30.01 km, and the point of 40 km was detected as 40.02 km

EXAMPLE 12

An optical fiber was prepared according to the same procedure in Example 1. A protective layer of silicone resin of the ultraviolet-curing type was coated on the optical fiber, the protective layer having a thickness of about 80 μm. Water-absorbent yarns (1000 denier) of acrylonitrile resin-based material was prepared. The optical fiber and tee water-absorbent yarns were disposed in parallel continuous relation to each other. Then, an expansion-restaaint layer of foamed polyethylene resin having a foamed degree of 60% was coated on the optical fiber and water-absorbent yarns so as to cover them, thereby forming an optical fiber sensor. The expansion-restraint layer had a thickness of 300 to 400 μm.

A plurality of the optical fiber sensors thus obtained were fusingly bonded end-to-end to provide a long, continuous optical fiber sensor of 30 km. The transmission loss was measured according to the same procedure in Example 1. The transmission loss increase was 0.4 dB at a point of 10 km and was 0.5 dB at a point of 20 km. Based on the transmission loss thus measured, the point of 10 km was detected as 10.02 km, and the point of 20 km was detected as 20.01 km.

Figure 8:
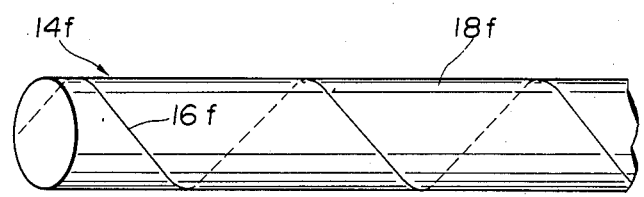
FIG. 8 is a perspective view of a portion of a further modified optical fiber sensor.

FIG. 8 shows a further modified optical fiber sensor 14f which comprises a rod-like water-absorbent member 18f of a circular cross-section, and an optical fiber 16f spirally wound around the water-absorbent member 18f a predetermined pitch. The water-absorbent member 18f is made of a material which is volumetrically expanded not less than 5 times when it absorbs water. The water-absorbent member 18f is made, for example, of a mixture of one of a thermoplastic resin and a rubber and a water-absorbent material. Such thermoplastic resin is, for example, polyvinyl chloride, polyethylene, EVA resin, EEA resin, polyester resin, polyurethane, styrene-type thermoplastic elastomer, olefin-type thermoplastic elastomer, ester-type thermoplastic elastomer, vinyl chloride-type thermoplastic elastomer, amide-type thermoplastic elastomer, diene-type thermoplastic elastomer or ionomer-type thermoplastic elastomer. For example, the rubber is 1,3-diene type rubber. The water-absorbent material is selected from the group consisting of polyacrylate-plyacrylic acid copolymer, polyvinyl alcohol-vinyl acetate copolymer, polyurethane, polyethylene oxide, starch graft copolymer and carboxymethylcellulose (CMC).

The optical fiber may be coated with a prttective layer as described for the preceding embodiments. In operation, when the optical fiber sensor 14f is subjected to water, that portion of the water-absorbent member 18f absorbs the water and radially expanded volumetrically. As a result, the expanded portion of the water-absorbent member 18f imparts a lateral pressure to that portion of the optical fiber 16f held in contact iith the expanded portion, so that that portion of the optical fiber 16f is subjected to bending. One end of the optical fiber 16f is connected to the detecting device 12 so that the device 12 detects the position of water penetration based on the bending of the optical fiber 16f, as in the preceding embodiments.

Figure 9:
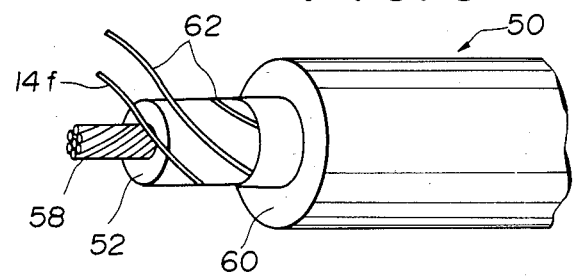
FIG. 9 is a perspective view of a portion of an optical fiber cable incorporating the ottical fiber sensor of FIG. 8.
Figure 10:
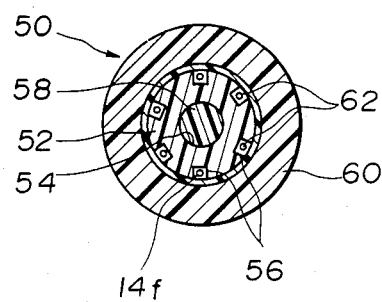
FIG. 10 is a cross-sectional view of the optical fiber cable of FIG. 9.

The optical fiber sensor of 14f is installed, for example in an optical fiber cable 50, as shown in FIGS. 9 and 10. The cable 50 comprises a spacer 52 of a tubular shape having a central axial bore 54 therethrough and having a plurality of spiral grooves 56 formed in the outer peripheral surface thereof a tension wire 58 of a high tensile material received in and extending along the central bore 54, and a sheath 60 covering the spacer 52. The optical fiber sensor 18f is received in one of the spiral grooves 56, and communication optical fibers 62 are received in the other spiral grooves 56. One end of the optical fiber sensor 14f is connected to the detecting device 12. When water penetrates into the optical fiber cable 50 and reaches the optical fiber sensor 14f, the water-absorbent member 18f is expanded so as to bend the optical fiber 16f locally. This localized bending is detected through the detecting device 12, and the position of the water penetration into the optical fiber cable 50 can be easily and rapidly detected in a manner described above.

Figure 11:
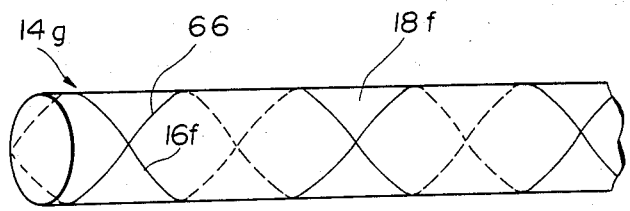
FIGS. 11 to 13 are view similar to FIG. 8 but showing further modified optical fiber sensors, respectively.

FIG. 11 shows a further modified optical fiber sensor 14g which differs from the optical fiber sensor 14f of FIG. 8 in that an expansion-restraint elongated element 66 is additionally spirally wounded around the rod-like water-absorbent member 18f. The elongated element 66 in the form of a yarn or filament is wound around the water-absorbent member 18f after the optical fiber 16f is wound the membe 18f, so that the yarn 66 overlies the optical fiber 16f where they intersect each other. The expansion-restraint yarn 66 is made of a material which does expand when subjected to water, and yarn 66 is made, for example, of Tetoron. The expansion-restraint yarn 66 is wound at a pitch at which the optical fiber 16f is wound, and they are wound in such a manner that they intersect each other at points spaced along the length of the water-absorbent member 18f. In FIG. 11, the optical fiber 16f and the yarn 66 intersect twice per each turn. The yarn 66 has such a tensile strength that it is not cut or severed when the water-absorbent member 18f absorbs water and expands volumetrically. The pitch of te spiral winding of the optical fiber 16f and the yarn 66 is such that they will not prevent the intrusion of water into the water-absorbent member 18f. When the water-absorbent member 18f absorbs water and expands radially outwardly, the expansion-restraint yarn 66 limits the radial expansion of the water-absorbent member 18f so as to amplify the bending of the optical fiber 16f at the water-absorbed portion of the member 18f and particularly at the intersections between the optical fiber 16f and the yarn 66.

Figure 12:
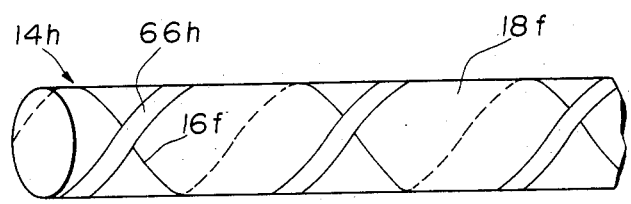

FIG. 12 shows a further modified optical fiber sensor 14h which differs from the optical fiber sensor 14f of FIG. 11 in that an expansion-restraint elongated element 66h is in the form of a tape. The expansion-restraint tape 66h is made, for example, of a synthetic resin such as polyester.

With respect to the optical fiber sensors 14f, 14g and 14h, the rod-like water-absorbent 18f may be replaced by one or more of elongated water-absorbent elements of any cross-section. Also, although only one optical fiber 16f is used, two or more of optical fibers bundled together can be used. Further, the optical fiber may be of the constant deviation type.

EXAMPLE 13

A silica-based optical fiber of the multi-mode type was prepared, the optical fiber having a core diameter of 50 μm and a clad diameter of 125 μm. The optical fiber had a refractive index difference of 1%. Then, a protective layer of urethane acrylate-based resin of the ultraviolet-curing resin was coated on the optical fiber, the resultant coated optical fiber having an outer diameter of 250 μm. A rod-like water absorbent member was prepared from a mixture of thermoplastic elastomer and polyacrylate-based water-absorbent resin, the water-absorbent member having a diameter of 1 mm and a length of 1 m. Then, the optical fiber with the protective layer was spirally wound around the water-absorbent member at a pitch of 30 mm to form a 1 meter-long optical fiber sensor similar to the optical fiber sensor 14f of FIG. 8. The water-absorbent mixture was volumetrically expanded about 70 times when absorbing water. The optical fiber sensor thus obtained was inserted in a pipe of a square cross-section having a longer side of 2.2 mm and a shorter side of 2.0 mm. Then, a pair of dummy optical fibers having respective lengths of 8 km and 5 km were connected at their one edds to the opposite ends of the optical fiber sensor, respectively. Then, the optical fiber sensor was immersed in water for 24 hours. Then, the water penetration was detected from the other ends of the two dummy fibers, using the detecting device 12. When light pulses were supplied to the other end of the 8 km-long dummy fiber, a transmission loss increase of 0.6 dB was detected at a point of 8.012 km. When light pulses were supplied to the other end of the 5 kx-long dummy fiber, a transmission loss increase of 0.6 dB was detected at a point of 5.00 km.

EXAMPLE 14

A expansion-restraint yarn of Tetoron was spirally wound at a pitch of 30 mm around the optical fiber sensor prepared according to the procedure of Example 1, in such a manner that the optical fiber intersected the yarn at points spaced spaced along the rod-like water-absorbent member, thereby providing an optical fiber sensor similar to the optical fiber sensor 14g of FIG. 11. The transmission loss was detected according to the same procedure in Example 13. When light pulses were supplied to the other end of the 8 km-long dummy fiber, a transmission loss increase of 1.2 dB was detected at a point of 7.992 km. When light pulses were supplied to the other end of the 5 km-long dummy fiber, a transmission loss increase of 1.3 dB was detected at a point of 5.00 km.

EXAMPLE 15

A expansion-restraint tape of polyester having a width of 5 mm was spirally wound at a pitch of 15 mm around the optical fiber sensor prepared according to the procedure of Example 1, in such a manner that the optical fiber intersected the tape at points spaced spaced along the rod-like water-absorbent member, thereby providing an optical fiber sensor similar to the optical fiber sensor 14h of FIG. 12. The transmission loss was detected according to the same procedure in Example 13. When light pulses were supplied to the other end of the 8 km-long dummy fiber, a transmission loss increase of 0.9 dB was detected at a point of 8.008 km. When light pulses were supplied to the other end of the 5 km-long dummy fiber, a transiission loss increase of 0.8 dB was detected at a point of 4.996 km.

Figure 13:
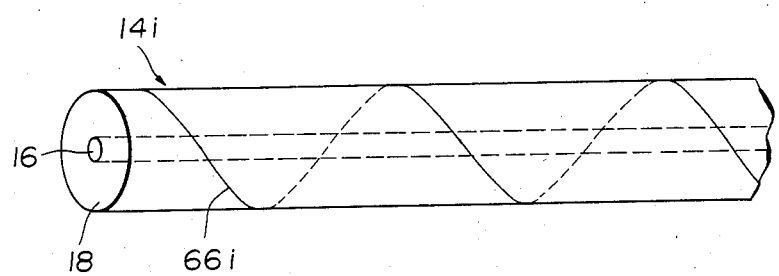

FIG. 13 shows a further modified optical fiber sensor 14i which differs from the optical fiber sensor 14 of FIG. 2 in that a expansion-restraint yarn 66i replaces the cover net 20. The yarn 66i is similar to the expansion-restraint yarn 66 of FIG. 11 and is wound around the water-absorbent member 18 at a pitch of 5 to 100 mm. The expansion-restraint yarn 66i limits the radial expansion of the water-absorbent member 18, thereby positively applying a lateral pressure to the optical fiber 16 when the water-absorbent member 18 absorbs water and expands volumetrically.

Figure 14:
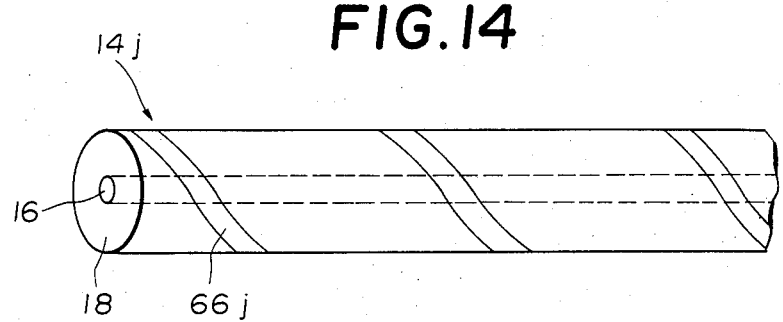
FIGS. 14 and 15 are views similar to FIG. 8 but showing modified optical fiber sensors.

FIG. 14 shows a further modified optical fiber sensor 14j which differs from the optical fiber sensor 14i of FIG. 13 in that an expansion-restraint tape 66j replaces the expansion-restraint yarn 66i of FIG. 13. The tape 66j is similar to the expansion-restraint tape 66h of FIG. 12.

Figure 15:
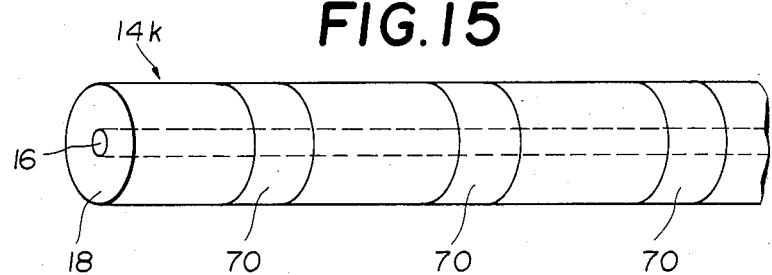

FIG. 15 shows a further modified optical fiber sensor 14k which differs from the optical fiber sensor 14i of FIG. 13 in that the expansion-restraint yarn 66i is replaced by a plurality of ring-like strips or tapes 70 wound around the water-absorbent member 18 at an equal interval along the length thereof. The expansion-restraint strips 70 is similar in nature to the expansion-restraint tape 66h of FIG. 12. In the case where the strips 70 are made of a thermoplastic material, each strip 66k is heated and fusingly secured to the water-absorbent member 18. The strips 70 can be secured to the water-absorbent member 18 by a suitable adhesive such as one prepared by dissolving in a solvent the same resin as the strip 70.

EXAMPLE 16

A silica-based optical fiber of the multi-mode type was prepared, the optical fiber having a core diameter of 50 μm and a clad diameter of 125 μm. The optical fiber had a refractive index difference of 1%. Then, a protective layer of thermosetting silicone of the ultraviolet-curing resin was coated on the optical fiber, the resultant coated optical fiber having an outer diameter of 400 μm. A water-absorbent member was coated on the protective layer, the water-absorbent member being made of a mixture of thermoplastic elastomer and polyacrylate-based water-absorbent resin. The water-absorbent member had an outer diameter of 1.2 mm. Then, an expansion-restraint yarn of Tetoron was spirally wound around the water-absorbent member at a pitch of 10 mm, thereby providing an optical fiber sensor similar to the optical fiber sensor 14i of FIG. 13. The water-absorbent mixture was expanded 70 times when it absorbed water. Then, the optical fiber sensor thus obtained was inserted in a pipe of a square cross-section having a longer side of 2.2 mm and a shorter side of 2.0 mm. Then, 1 meter of the optical fiber sensor was immersed in water for 24 hours. The transmission loss was detected using the detecting device 12, and a transmission loss increase of 1.5 dB was detected at the position of water-immersion.

EXAMPLE 17

An optical fiber was prepared according to the same procedure of Example 16. Then, a first protective layer of thermosetting silicone was coated on the optical fiber, and a second protective layer of nylon was coated on the first protective layer. The outer diameter of the first protective layer was 250 μm, and the outer diameter of the second protective layer was 500 μm. Then, a water-absorbent member was coated on the second protective layer, the water-absorbent member having an outer diameter of 1.2 mm and being made of the same material as the water-absorbent member of Example 16. Then, an expansion-restraint yarn of Tetoron was spirally wound around the water-absorbent member at a pitch of 10 mm to form an optical fiber sensor similar to the optical fiber sensor 14i of FIG. 13. Then, the optical fiber sensor thus obtained was inserted in a pipe similar to that of Example 16, and a pair of 20 km-long dummy optical fibers were connected to the opposite ends of the optical fiber sensor. 1 meter of the optical fiber sensor was immersed in water for 24 hours. Then, the transmission loss was detected using the detecting device 12. A transmission loss increase of 0.9 dB was detected at a point of 20.012 km.

EXAMPLE 18

An optical fiber sensor was prepared according to the same procedure of Example 16. According to the same procedure of Example 17, the optical fiber was immersed in water, and the transmission loss was detected. A transmission loss increase of 1.5 dB was detected at a point of 20.000 km.

EXAMPLE 19

An optical fiber with a protective layer and a water-absorbent member was prepared according to the same procedure of Example 16. Then, an expansion-restraint tape of polyester was spirally wound around the water-absorbent member at a pitch of 15 mm to form an optical fiber sensor similar to the optical fiber sensor 14j of FIG. 14. The expansion-restraint tape had a width of 5 mm. Then, the optical fiber sensor thus obtained was inserted in a pipe similar to the pipe of Example 16. Then, a pair of dummy optical fibers having respective lengths of 18 km and 3 km were connected at their one ends to the opposite ends of the optical fiber sensor. 1 meter of the optical fiber sensor was immersed in water for 24 hours. When light pulses were supplied to the other end of the 18 km-long dummy fiber, a transmission loss increase of 1.1 dB was detected at a point of 18.020 km. When light pulses were supplied to the other end of the 3 km-long dummy fiber, a transmission loss increas of 1.1 dB was detected at a point of 3.008 km.

EXAMPLE 20

A silica-based optical fiber of the single-mode type was prepared, the optical fiber having a mode field diameter of 10 μm and a clad diameter of 125 μm. Then, a protective layer of thermosetting silicone was coated on the optical fiber, the resultant coated optical fiber having an outer diameter of 400 μm. Then, a water-absorbent member was coated on the protective layer, the water-absorbent member having an outer diameter of 1.0 mm and being made of the same material as the water-absorbent member of Example 16. Then, an expansion-restraint yarn of Tetoron was spirally wound around the water-absorbent member at a pitch of 10 mm to form an optical fiber sensor similar to the optical fiber sensor 14i of FIG. 13. Then, the optical fiber sensor was inserted in a pipe similar to the pipe of Example 16. Then, a pair of 20 km-long dummy optical fibers were connected at their one ends to the opposite ends of the optical fiber sensor. 1 meter of the optical fiber sensor was immersed in water for 24 hours. The transmission loss was detected according to the same procedure of Example 16, and a transmission loss increase of 0.3 dB dB was detected at a point of 20.020 km.

What is claimed is:

1. A water penetration-detecting apparatus comprising:
   (a) an optical fiber sensor comprising (i) an optical fiber, and (ii) a water-absorbent material disposed along said optical fiber in contiguous relation to said fiber, said water-absorbent material, when absorbing water, expanding volumetrically so as to apply a pressure to an outer peripheral surface of said optical fiber to bend said fiber; and
   (b) a detecting means for detecting a bending of said optical fiber.

2. An apparatus according to claim 1, in which said water-absorbent material is in the form of a coating mounted around an entire circumferential surface of said optical fiber.

3. An apparatus according to claim 2, in which an elongated expansion-restraint member is spirally wound around said water-absorbent coating so as to limit a radial expansion of said water-absorbent coating.

4. An apparatus according to claim 2, in which a plurality of expansion-restraint elements of a ring-like shape are mounted around said water-absorbent coating and spaced from one another along said optical fiber, said expansion-restraint elements limiting a radial expansion of said water-absorbent coating.

5. An apparatus according to claim 3, in which an expansion-restraint member in the form of a tubular net is fitted over said water-absorbent coating so as to limit a radial expansion of said water-absorbent coating. An optical fiber cable comprising (a) a sheath; (b) a plurality of communication optical fibers mounted within said sheath; (c) an optical fiber sensor mounted within said sheath and comprising (i) an optical fiber, and (ii) a water-absorbent material disposed along said optical fiber of said sensor in contiguous relation thereto, said water-absorbent material, when absorbing water, expanding volumetrically so as to apply 6. An apparatus according to claim 1, in which the optical fiber comprises an expansion restraint member disposed in the vicinity of and extending along said water-absorbent material so as to direct expansion of the water-absorbent material towards the optical fiber to thereby bend the optical fiber when absorbing water.

7. An apparatus according to claim 6, in which said expansion-restraint member is of an annular cross-section and has water-passage means for passing water radially therethrough to the water absorbent material.

8. An apparatus according to claim 7, in which said water-absorbent material is in the form of a rod disposed generally parallel to said optical fiber.

9. An apparatus according to claim 7, in which said water-absorbent material is in the form of yarns.

10. An apparatus according to claim 7, in which said water-absorbent material is in the form of powder filled in a space formed between said optical fiber and said expansion-restraint member.

11. An apparatus according to claim 7, in which said water-absorbent material is in the form of a coating mounted around an entire circumferential surface of said optical fiber, said water-passage means being provided along a straight line, said optical fiber being disposed eccentric with respect to said water-absorbent coating in a direction away from said water-passage means.

12. An apparatus according to claim 1, in which said water-absorbent material is in the form of a rod around which said optical fiber is spirally wound.

13. An apparatus according to claim 12, in which an elongated expansion-restraint member is spirally wound around said optical fiber in such a manner that said optical fiber and said expansion-restraint member intersect each other at points spaced along the length of said rod-like water-absorbent member and that said expansion-restraint member overlies said optical fibers at the intersections between said expansion-restraint member and said optical fiber, said expansion-restraint member limiting a radial expansion of said water-absorbent rod.

14. An optical fiber cable comprising:
(a) a sheath;
(b) a plurality of communication optical fibers mounted within said sheath;
(c) an optical fiber sensor mounted within said sheath and comprising (i) an optical fiber, and (ii) a water-absorbent material disposed along said optical fiber of said sensor in contiguous relation thereto, said water-absorbent material, when absorbing water, expanding volumetrically so as to apply a pressure to an outer peripheral surface of said optical fiber of said sensor to bend said fiber, said optical fiber sensor being adapted to be connected to a detecting means for detecting a bending of said optical fiber of said sensor.

15. An optical fiber cable according to claim 14, in which there is provided a spacer of a tubular shape having an central axial bore therethrough and covered by said sheath, a plurality of spiral grooves being formed on an outer peripheral surface of said spacer, a tension wire of a high tensile strength being received in and extending along said axial bore, said optical fiber sensor being received in one of said spiral grooves while said communication optical fibers are received in the other spiral grooves, respectively.

* * * * *

UNITED STATES PATENT AND TRADEMARK OFFICE
CERTIFICATE OF CORRECTION

PATENT NO. : 4,812,014
DATED : Mar. 14, 1989
INVENTOR(S) : Sawano et al.

It is certified that error appears in the above-identified patent and that said Letters Patent is hereby corrected as shown below:

| | |
|---|---|
| Col. 1, line 17 | Delete "hhe" and substitute --the-- |
| Col. 1, line 19 | Delete "calle" and substitute --cable-- |
| Col. 1, line 24 | Correct spelling of --occurred-- |
| Col. 1, line 68 | Correct spelling of --detecting-- |
| Col. 2, line 8 | Correct spelling of --optical-- |
| Col. 2, line 21 | Correct spelling of --views-- |
| Col. 2, line 38 | Correct spelling of --surface-- |
| Col. 3, line 12 | Correct spelling of --sensor-- |
| Col. 3, line 25 | Correct spelling of --preform-- |
| Col. 4, line 15 | Correct spelling of --water-- |
| Col. 5, line 18 | Correct spelling of --fiber-- |
| Col. 5, line 60 | Correct spelling of --detecting-- |
| Col. 6, line 13 | Delete "an" and substitute --and-- |
| Col. 6, line 43 | Correct spelling of --optical-- |
| Col. 7, line 5 | Delete "notche" and substitute --notches-- |
| Col. 8, line 38 | Correct spelling of --glass-- |
| Col. 9, line 11 | Correct spelling of --protective-- |
| Col. 10, line 29 | Correct spelling of --inner-- |
| Col. 10, line 54 | Correct spelling of --optical-- |
| Col. 11, line 31 | Delete "s" and substitute --so-- |
| Col. 11, line 37 | Delete "444e)" and substitute --(44e)-- |
| Col. 11, line 58 | Delete "hadaa" and substitute --had a -- |
| Col. 12, line 49 | Correct spelling of --protective-- |
| Col. 12, line 56 | Correct spelling of --with-- |
| Col. 12, line 68 | Insert --,-- after "thereof" |
| Col. 13, line 22 | Correct spelling of --member-- |
| Col. 13, line 35 | Delete "te" and substitute --the-- |

UNITED STATES PATENT AND TRADEMARK OFFICE
CERTIFICATE OF CORRECTION

PATENT NO. : 4,812,014

DATED : Mar. 14, 1989

INVENTOR(S) : Sawano et al.

It is certified that error appears in the above-identified patent and that said Letters Patent is hereby corrected as shown below:

Col. 14, line 13   Delete "edds" and substitute --ends--
Col. 14, line 40   Delete "5.00" and substitute --5.004--

Col. 15, line 1    Delete "s" after "14"
Col. 15, line 45   Correct spelling of --increase--
Col. 16, line 23   Correct spelling of --optical--
Col. 16, line 32   Correct spelling of --increase--
Col. 17, line 16   Delete "3" and substitute --2--
Col. 17, lines 19-27   Delete "An ... apply"

Signed and Sealed this

Tenth Day of July, 1990

Attest:

HARRY F. MANBECK, JR.

*Attesting Officer*    *Commissioner of Patents and Trademarks*